(No Model.)
D. D. BUICK.
FLUSHING APPARATUS FOR SIPHON WATER CLOSETS.
No. 372,964. Patented Nov. 8, 1887.
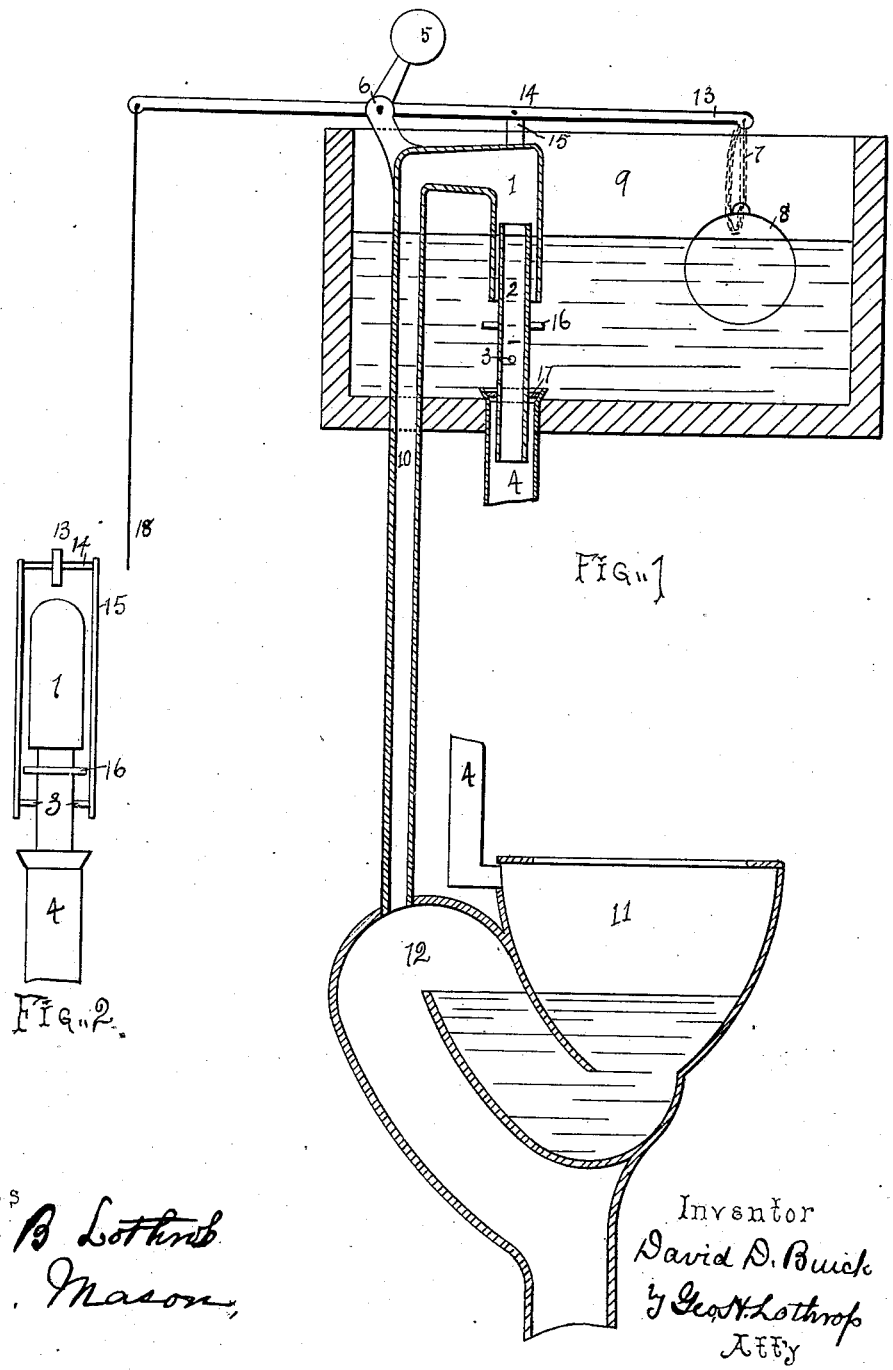

UNITED STATES PATENT OFFICE.

DAVID D. BUICK, OF DETROIT, MICHIGAN.

FLUSHING APPARATUS FOR SIPHON WATER-CLOSETS.

SPECIFICATION forming part of Letters Patent No. 372,964, dated November 8, 1887.

Application filed May 14, 1887. Serial No. 238,227. (No model.)

*To all whom it may concern:*

Be it known that I, DAVID D. BUICK, of Detroit, in the county of Wayne and State of Michigan, have invented a new and useful Improvement in Flushing Apparatus for Siphon Water-Closets, of which the following is a specification.

My invention consists in an improvement in flushing apparatus for siphon water-closets, hereinafter fully described.

Figure 1 is a sectional elevation of the flushing apparatus and closet, and Fig. 2 is an elevation of the valve.

11 represents the bowl of an ordinary siphon-closet, having the usual trap formed at the bottom and side of the bowl. In practice there will be a second trap below the bowl, so that the air-space 12 will be between two traps; but this is not illustrated, because it is well known and not of my invention.

9 represents an elevated tank, which is supplied with water from any convenient source, and in practice the supply of water to the tank is to be regulated by an ordinary float-valve, which I have not deemed necessary to illustrate.

4 represents a discharge-pipe leading from the bottom of tank 9 to the bowl 11, its upper end being a valve-seat.

10 represents a pipe which leads from the air-space to a point above the water-level in tank 9, and then branches laterally and has a downward extension, 1, into the water in the tank below the water-level and over the upper end of discharge-pipe 4. Pipe 10 may pass up through the tank, as shown, or outside of the tank.

2 represents the valve-stem. It consists of a piece of pipe extending downward into discharge-pipe 4 and up into the pipe 1 above the normal water-level, the external diameter of stem 2 being nearly the same as the internal diameter of pipe 1.

17 represents a valve secured on stem 2, and adapted to close the upper end of discharge-pipe 4.

16 represents another valve secured on stem 2, and adapted, when said stem is raised, to close the lower end of pipe 1.

3 represents a pin secured to and extending from valve-stem 2, and 14 15 represent a yoke attached to said pin 3, to operate the valve-stem.

13 represents a lever pivoted at 6, having a pull-cord, 18, attached to one end thereof, and a float-weight, 8, attached to the other end by a chain, 7, or other flexible or sliding connection, which must be too short to allow the float-weight to rest on the bottom of the tank.

5 represents an arm and weight secured to lever 13 above its fulcrum to hold said lever at either end of its stroke, as fully explained in former applications for patents filed by me. Lever 13 is pivotally connected to the yoke 14 15, so that when moved it will raise or lower valve-stem 2.

The operation of my invention is as follows: When cord 18 is pulled, valve-stem 2 is raised, opening discharge-pipe 4 and closing pipe 1. Water from the tank rushes into discharge-pipe 4, passing around the lower end of valve-stem 2. This draws air from air-space 12 through pipes 10 1 and valve-stem 2, thus forming a partial vacuum in air-space 12 and causing the contents of the bowl 11 to be siphoned out in the ordinary manner. Weight 5 holds valve-stem 2 raised until the lowering of the water in the tank causes the float-weight 8 to pull on lever 13 and force valve-stem 2 down until valve 17 seats. The tank then fills again to its normal level. When pull 18 is to be operated by the seat of the water-closet, it must be so arranged that it will only be pulled when the user's weight is removed from the seat.

I am aware of Letters Patent No. 262,232 to Peters and Donald, and No. 291,139 to John Boyle, and do not claim anything therein shown and described.

What I claim as my invention, and desire to secure by Letters Patent, is—

1. In combination with a siphon water-closet, an elevated water-tank, a discharge-pipe leading from the bottom of the tank to the bowl of the closet, a pipe rising from the space between the traps of the closet above the water-line in the tank and then dipping below the water-line, and a hollow valve-stem connecting the air-pipe and discharge-pipe and carrying thereon a valve adapted to close the discharge-pipe, substantially as and for the purposes set forth.

2. In combination with a siphon water-closet, an elevated water-tank, a discharge-pipe leading from the bottom of the tank to the bowl of the closet, an air-pipe extending from a part of the bowl to a point above the water-line in the tank, and a hollow valve-stem connecting the air-pipe and discharge-pipe, and carrying thereon a valve adapted to close the discharge-pipe, substantially as and for the purposes set forth.

3. The combination, with the elevated tank, of the discharge-pipe 4, leading from the bottom thereof, the air-pipe 10, extending above the water-level in the tank, and having the downward extension 1, and the hollow valve-stem 2, connecting the said downward extension with the discharge-pipe, and having two valves, 16 and 17, substantially as described.

DAVID D. BUICK.

Witnesses:
GEO. H. LOTHROP,
C. M. MASON.